US010061083B2

(12) United States Patent
McLaughlin

(10) Patent No.: US 10,061,083 B2
(45) Date of Patent: Aug. 28, 2018

(54) WAVELENGTH DISPERSING DEVICE

(71) Applicant: Lumentum Operations LLC, Milpitas, CA (US)

(72) Inventor: Sheldon McLaughlin, Ottawa (CA)

(73) Assignee: Lumentum Operations LLC, Milpitas, CA (US)

(*) Notice: Subject to any disclaimer, the term of this patent is extended or adjusted under 35 U.S.C. 154(b) by 48 days.

(21) Appl. No.: 15/167,459

(22) Filed: May 27, 2016

(65) Prior Publication Data

US 2016/0341901 A1 Nov. 24, 2016

Related U.S. Application Data

(60) Continuation of application No. 14/166,248, filed on Jan. 28, 2014, now Pat. No. 9,354,365, which is a
(Continued)

(51) Int. Cl.
| | |
|---|---|
| *G01J 3/28* | (2006.01) |
| *G02B 6/293* | (2006.01) |
| *G01J 3/02* | (2006.01) |
| *G01J 3/18* | (2006.01) |
| *G01J 3/22* | (2006.01) |

(Continued)

(52) U.S. Cl.
CPC ............ *G02B 6/29313* (2013.01); *G01J 3/02* (2013.01); *G01J 3/021* (2013.01); *G01J 3/0205* (2013.01); *G01J 3/0208* (2013.01); *G01J 3/0243* (2013.01); *G01J 3/0256* (2013.01); *G01J 3/0291* (2013.01); *G01J 3/1804* (2013.01); *G01J 3/22* (2013.01); *G02B 5/12* (2013.01); *G02B 5/1809* (2013.01); *G02B 5/1814* (2013.01); *G02B 5/1866* (2013.01); *G02B 6/2931* (2013.01); *G02B 6/2938* (2013.01); *G02B 6/29311* (2013.01);
(Continued)

(58) Field of Classification Search
CPC .............. G02B 5/1866; G02B 6/29307; G02B 27/0172
USPC ........... 359/566, 569; 356/328, 320; 385/24, 385/37; 398/48, 49, 57, 83, 84, 87
See application file for complete search history.

(56) References Cited

U.S. PATENT DOCUMENTS

| | | | |
|---|---|---|---|
| 3,922,089 A | 11/1975 | Danielsson et al. | |
| 4,410,241 A | 10/1983 | de Lang et al. | |

(Continued)

OTHER PUBLICATIONS

Shields et al, "Microelectromechanical system-based adaptive space-variant imaging microspectrometer", Applied Optics, vol. 46, No. 31, p. 7631, 2007.

(Continued)

*Primary Examiner* — Audrey Y Chang
(74) *Attorney, Agent, or Firm* — Harrity & Harrity, LLP

(57) ABSTRACT

A compact wavelength dispersing device and a wavelength selective optical switch based on the wavelength dispersing device is described. The wavelength dispersing device has a folding mirror that folds the optical path at least three times. A focal length of a focusing coupler of the device is reduced and the NA is increased, while the increased optical aberrations are mitigated by using an optional coma-compensating wedge. A double-pass arrangement for a transmission diffraction grating allows further focal length and overall size reduction due to increased angular dispersion.

18 Claims, 13 Drawing Sheets

Related U.S. Application Data division of application No. 12/432,829, filed on Apr. 30, 2009, now abandoned.

(60) Provisional application No. 61/129,136, filed on Jun. 6, 2008, provisional application No. 61/071,510, filed on May 2, 2008.

(51) Int. Cl.
    *G02B 5/18*   (2006.01)
    *G02B 5/12*   (2006.01)
    *G02B 6/35*   (2006.01)
    *G02B 17/08*  (2006.01)

(52) U.S. Cl.
    CPC ......... *G02B 6/354* (2013.01); *G02B 17/0856* (2013.01); *G02B 2005/1804* (2013.01)

(56) References Cited

U.S. PATENT DOCUMENTS

| | | | |
|---|---|---|---|
| 4,690,559 A | 9/1987 | Florek et al. | |
| 4,849,640 A | 7/1989 | Kruishoop | |
| 5,192,981 A | 3/1993 | Slutter et al. | |
| 5,285,255 A | 2/1994 | Baranne et al. | |
| 5,301,062 A | 4/1994 | Takahashi et al. | |
| 5,424,827 A | 6/1995 | Horwitz et al. | |
| 5,496,993 A | 3/1996 | Kasuga | |
| 5,589,717 A | 12/1996 | Chau | |
| 5,841,584 A | 11/1998 | Takatani et al. | |
| 5,859,702 A | 1/1999 | Lindblom | |
| 6,108,471 A | 8/2000 | Zhang et al. | |
| 6,181,418 B1 | 1/2001 | Palumbo et al. | |
| 6,181,427 B1 | 1/2001 | Yarussi et al. | |
| 6,288,781 B1 | 9/2001 | Lobb | |
| 6,303,934 B1 | 10/2001 | Daly et al. | |
| 6,335,532 B1* | 1/2002 | Tanaka | H01J 37/21 250/397 |
| 6,421,481 B1 | 7/2002 | Sappey | |
| 6,462,882 B2 | 10/2002 | Chen et al. | |
| 6,489,872 B1 | 12/2002 | Bouevitch et al. | |
| 6,498,872 B2 | 12/2002 | Bouevitch et al. | |
| 6,597,452 B1 | 7/2003 | Jiang et al. | |
| 6,707,959 B2 | 3/2004 | Ducellier et al. | |
| 6,744,505 B1 | 6/2004 | Wang et al. | |
| 6,760,501 B2 | 7/2004 | Iyer et al. | |
| 6,765,724 B1* | 7/2004 | Kramer | G02B 5/1866 356/328 |
| 6,795,182 B2 | 9/2004 | Rakuljic et al. | |
| 6,798,951 B2* | 9/2004 | Fabiny | G02B 6/29307 385/24 |
| 7,041,979 B2 | 5/2006 | Chrisp | |
| 7,215,605 B2 | 5/2007 | Jutte | |
| 7,239,386 B2 | 7/2007 | Chrisp et al. | |
| 7,345,760 B2 | 3/2008 | Deck | |
| 7,359,051 B2* | 4/2008 | Shibata | G01J 3/02 356/328 |
| 9,354,365 B2 | 5/2016 | McLaughlin | |
| 2002/0122259 A1* | 9/2002 | Chen | G02B 27/0172 359/631 |

OTHER PUBLICATIONS

Palmer, "Diffraction Grating Handbook", Richardson Grating Laboratory, pp. 8-30; 52-57; 69-83, 2000.

\* cited by examiner

WAVELENGTH DISPERSING DEVICE

CROSS-REFERENCE TO RELATED APPLICATIONS

This application is a continuation of U.S. patent application Ser. No. 14/166,248, filed Jan. 28, 2014 (now U.S. Pat. No. 9,354,365), which is a divisional of U.S. patent application Ser. No. 12/432,829, filed Apr. 30, 2009, which claims priority from U.S. Provisional Patent Application No. 61/071,510, filed May 2, 2008, and U.S. Provisional Patent Application No. 61/129,136, filed Jun. 6, 2008, the contents of which are incorporated herein by reference.

TECHNICAL FIELD

The present invention relates to wavelength dispersing devices, and in particular to free-space optics based compact wavelength dispersing devices for use in wavelength selective optical switches and optical spectrometers.

BACKGROUND OF THE INVENTION

A wavelength dispersing device is an optical device for spatially separating spectral components of light for subsequent measurements and, or for further routing or switching of these spectral components.

A wavelength dispersing device is a key component of an apparatus for measuring a spectrum of light, or an optical spectrometer. Optical spectrometers are used for remote sensing of temperature, determining chemical composition and concentration of chemical compounds, identifying substances, determining parameters of optical channels in an optical communications network, and other applications. A wavelength dispersing device is also one of the key components of a wavelength selective optical switch for independent wavelength-selective switching of individual wavelength channels in an optical communications network. An optical channel equalizer for dynamic equalization of optical power levels of the individual wavelength channels and an optical gain equalizer for dynamic equalization of optical gain levels of the individual wavelength channels in an optical amplifier can also be based on a wavelength dispersing device.

Despite proliferation of wavelength dispersing technologies based on compact planar lightwave circuits or fiber Bragg gratings, a technology based on free space optics such as a diffraction grating or a dispersive prism still remains one of the most frequently used and relied upon for high levels of performance and high reliability. A diffraction grating diffracts a light beam impinging thereon into a fan of narrowband sub-beams at individual wavelengths. A diffraction grating, although invented about two hundred years ago, has an advantage of a high achievable diffraction efficiency and a low achievable wavefront distortion. A low polarization sensitivity of a diffraction grating is also attainable in some cases.

With regards to application of diffraction grating based wavelength dispersive devices for optical communications networks, a folded symmetrical 4-f free-space optical configuration taught in U.S. Pat. No. 6,498,872 by Bouevitch et al., with an optional field-flattening optical wedge taught in U.S. Pat. No. 6,760,501 by Iyer et al., both assigned to JDS Uniphase Corporation and incorporated herein by reference, allow construction of dynamic gain equalizers for equalizing optical power values of individual wavelength channels, wavelength blockers for completely blocking any subset of a full set of the wavelength channels, and wavelength selective optical switches for performing the abovementioned wavelength channel switching function.

As an example, referring to FIG. 1, a prior-art optical configuration of a wavelength selective optical switch (WSS) 10 is shown. The optical elements of the WSS 10 are: a front end 11 for launching and receiving free-space optical beams having a plurality of wavelength channels, a concave mirror 12 for focusing and collimating optical beams, a diffraction grating 13 for spatially dispersing an input optical beam into the wavelength channels and for combining the wavelength channels into an output optical beam, a field-flattening wedge 14 for reducing spherical aberration of the WSS 10, and an optical switching engine 15 for selectively switching individual wavelength channels from an input optical port 16 to an output optical port 17, wherein both the input and the output ports 16 and 17 are optically coupled to the front end 11. The optical switching engine 15 has an array of beam directing elements, or "directors", which can be either micro-electro-mechanical system (MEMS) micromirrors or liquid crystal (LC) pixels.

In operation, an input optical signal is launched into the input optical port 116 of the front end 11 optically coupled by the concave mirror 12 to the diffraction grating 13, which disperses an incoming optical beam 18 into narrowband sub-beams 19 carrying individual wavelength channels. Throughout the specification, the term "narrowband" is understood as having a narrow wavelength range as compared to a wavelength range of the light beam. By a way of non-limiting example, a wavelength range, or a bandwidth of a single wavelength channel could be 0.4 nm, whereas the wavelength range of the light beam 18 could be 32 nm. The concave mirror 12 couples the narrowband sub-beams 19 to the optical switching engine 15, which spatially redirects the narrowband sub-beams 19. Upon reflecting from the optical switching engine 15, the narrowband sub-beams 19 are collimated by the mirror 12, recombined by the dispersive element 13, and focused by the mirror 12 back into the front end 11 coupled to the output optical port 17. Depending upon the state of individual pixels, not shown, of the optical switching engine 15, the individual wavelength channels may be attenuated, switched to the output port 17, or suppressed. The footprint of the WSS 10 of FIG. 1 for a 100 GHz channel spacing is approximately 2×3 inches. A detailed description of operation of the WSS 10 shown in FIG. 1 can be found in the abovementioned US Patent documents.

Although WSS 10 has a folded optical path as explained, which allows an optics footprint reduction, a market pressure exists to further reduce the size of the optics of WSS devices and the wavelength dispersing devices they are based upon. This market pressure is caused in part by competing planar technologies and results from a desire of optical communication system providers to offer higher levels of functionality at the same or smaller size and cost of their circuit packs.

One known way to reduce the overall size of the WSS 10 is to reduce the focal length of the concave mirror 12. However, the spacing of optical wavelength channel sub-beams along the switching engine 15 has also to be scaled down in proportion to the focal length of the concave mirror 12. Switching engine technologies have limits of the minimum practical size of the individual directors; therefore, at a given angular dispersion of the dispersive element 13, a limit exists for the minimum focal length of the concave mirror 12. Furthermore, to maintain a given spectral resolution expressed as a ratio of the wavelength channel spacing to a spot width of the sub-beams 19 at the switching engine 15, the spot width must also scale with the focal length of the concave mirror 12. This means that the numerical aperture (NA) of the sub-beams 19 in the dispersion direction must scale inversely with the focal length of the concave mirror 12. As the beam NA becomes larger, optical aberrations become more problematic.

Another known footprint reduction technique of a free space optical wavelength dispersing device is to introduce folding mirrors into an optical layout of the wavelength dispersing device. Turning to FIG. 2, a prior-art monochromator 20 of U.S. Pat. No. 6,597,452 by Jiang et al. is presented. U.S. Pat. No. 6,597,452 is incorporated herein by reference. The monochromator 20 is used for selecting one monochromatic component of a polychromatic light, for example, in a spectrometer application. The monochromator 20 has a front end 21, a concave mirror 22, a diffraction grating 23, and a folding mirror 24. In operation, a diverging optical beam 25 emitted by the front end 21 impinges onto the concave mirror 22 that collimates the diverging optical beam 25 into a collimated beam 26 and directs the collimated beam 26 towards the folding mirror 24. The folding mirror 24 directs the collimated beam 26 towards the diffraction grating 23, which reflects one monochromatic component 27 to propagate back towards the front end 21 for outputting from the monochromator 20. The monochromator 20 is tuned by rotating the diffraction grating 23 as indicated by arrows 28.

Yet another known way to reduce a footprint of a free space optical wavelength dispersing device is to double-pass light through a transmission diffraction grating (T-DG), to effectively double the angular dispersion of light, so that the focal length of a focusing element of the wavelength dispersing device can be reduced. Referring now to FIG. 3, a double pass arrangement 30 for a T-DG 31 is shown. This arrangement is taught in U.S. Pat. No. 6,765,724 by Kramer, which is incorporated herein by reference. An incoming beam 32 is diffracted by the T-DG 31 to form narrowband sub-beams 33A and 33B at an angle ΔΘ therebetween. The narrowband sub-beams 33A and 33B are reflected by a mirror 34 to propagate back towards the diffraction grating 31, which further diffracts the sub-beams 33A and 33B to form narrowband sub-beams 35A and 35B, respectively, at an angle 2ΔΘ therebetween. Thus, effective wavelength dispersion of the T-DG 32 doubles upon double passing the light beam 32 through the T-DG 32.

One drawback of the approach represented by FIG. 3 is that the T-DG 31 creates multiple reflections as a result of the diffraction occurring both in reflection and transmission directions. As a result of these multiple reflections, multiple stray light beams are created, resulting in deleterious optical cross-talk.

It is an object of the present invention to provide a wavelength dispersing device for use in optical spectrometers and wavelength selective optical switches, which is free from the above mentioned drawbacks. Advantageously, a wavelength dispersing device of the present invention achieves a high degree of space utilization and high spectral dispersion, without associated excessive optical aberrations or stray light-induced optical cross-talk. This enhanced optical performance at a compact size is attained without having to rely on a large number of additional optical elements.

SUMMARY OF THE INVENTION

In accordance with the invention there is provided a wavelength dispersing device for dispersing a light beam into narrowband sub-beams having focal spots spaced apart along a line of dispersion, the wavelength dispersing device comprising:

an input port for inputting the light beam;
a dispersive unit optically coupled to the input port, for dispersing the light beam into the narrowband sub-beams;
a focusing coupler having optical power in a plane containing the line of dispersion, for receiving the spatially separated narrowband sub-beams from the dispersive unit and for focusing them onto the line of dispersion, so that the focal spots of the narrowband sub-beams are disposed along the line of dispersion; and
a folding mirror disposed in optical paths between:
  the input port and the dispersive unit;
  the dispersive unit and the focusing coupler; and
  the focusing coupler and the line of dispersion.

In accordance with another aspect of the invention there is further provided a wavelength dispersing device for dispersing a light beam into narrowband sub-beams in a plane of dispersion and for focusing the narrowband sub-beams into focal spots in a focal plane, the wavelength dispersing device comprising:

an input port for inputting the light beam;
a folding mirror for folding optical paths of the light beam and of the narrowband sub-beams;
a dispersive unit for dispersing the light beam into the narrowband sub-beams in the plane of dispersion; and
a concave mirror having optical power in the plane of dispersion, for focusing the narrowband sub-beams into the focal spots in the focal plane;
wherein in operation, the light beam from the input port is coupled to the folding mirror; from the folding mirror to the dispersive unit that disperses the light beam into the narrowband sub-beams that are coupled back to the folding mirror; from the folding mirror to the concave mirror for focusing the narrowband sub-beams; from the concave mirror back to the folding mirror; and from the folding mirror to the focal plane, wherein the narrowband sub-beams are focused into the focal spots.

According to another aspect of the present invention, there is further provided a wavelength dispersing device for dispersing a light beam into narrowband sub-beams having focal spots spaced apart along a line of dispersion, comprising:

an input port for inputting the light beam;
a dispersive unit optically coupled to the input port, for dispersing the light beam into the narrowband sub-beams;
a focusing coupler having optical power in a plane containing the line of dispersion, for receiving the spatially separated narrowband sub-beams from the dispersive unit and for focusing them onto the line of dispersion, so that the focal spots of the narrowband sub-beams are disposed along the line of dispersion; and
a coma-compensating optical element having two flat optical faces disposed in an optical path between the focusing coupler and the line of dispersion, for compensating coma of the focusing coupler and for reducing an average width of the focal spots along the line of dispersion.

According to another aspect of the present invention, there is further provided a dispersive unit for spatially separating a optical beam into narrowband sub-beams,
  wherein the narrowband sub-beams are co-planar in a plane of dispersion,
  wherein in operation, stray optical beams resulting from stray reflections of the narrowband sub-beams in the dispersive unit form a non-zero angle with the plane of dispersion, the dispersive unit comprising:
a flat transmission diffraction grating (T-DG) for receiving the optical beam and dispersing the optical beam into the narrowband sub-beams, and
a flat retroreflector for reflecting the narrowband sub-beams dispersed by the T-DG back to the T-DG, for additional dispersing by the T-DG in the plane of dispersion;
wherein the T-DG has parallel grating lines, and wherein the T-DG and the retroreflector are disposed so that so that at least one of the narrowband sub-beams on the T-DG is not perpendicular to the grating lines, whereby in operation, the stray optical beams form a non-zero angle with the plane of dispersion.

BRIEF DESCRIPTION OF THE DRAWINGS

Exemplary embodiments will now be described conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

According to the present invention, one approach to reducing size of a wavelength dispersing device and a WSS based thereupon is to scale down the entire device, that is, reduce the focal length of a focusing coupler such as a concave mirror, while positioning optical elements off-axis when required for more compact device construction. Reduction of the focal length and, or off-axis construction is accompanied by increasing NA of the light beams and at the same time correcting for optical aberrations which, as has been explained before, have a tendency to increase with increased NA of the light beams. An aberration correcting approach of the present invention is discussed below.

Figure 4:
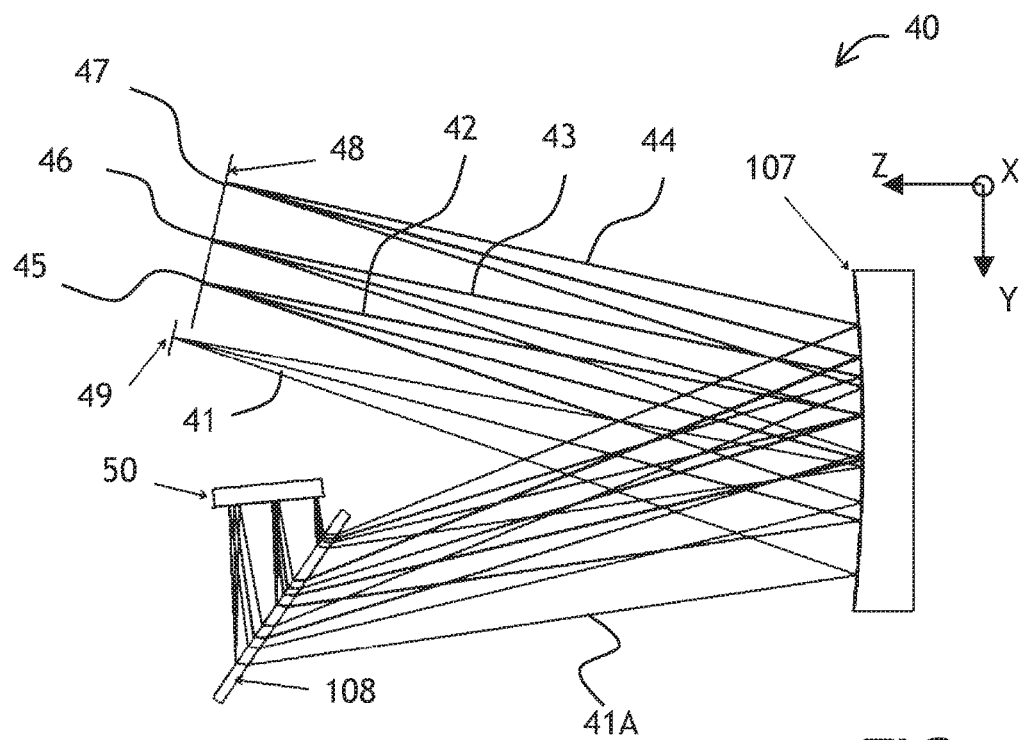
FIG. 4 is a plan view of an off-axis wavelength dispersing device.

Referring to FIG. 4, a plan view of an off-axis wavelength dispersing device 40 is presented. The wavelength dispersing device 40 is used for dispersing a light beam 41 into narrowband sub-beams 42 to 44 having focal spots 45 to 47 spaced apart along a line of dispersion 48. The term "narrowband" is understood as having a narrow wavelength range as compared to a wavelength range of the light beam. The wavelength dispersing device 40 has an input port 49, a spherical mirror 107, a transmission diffraction grating (T-DG) 108, and a retroreflector 50. In operation, the light beam 41 having a numerical aperture of 0.07 emerges from the input port 49, which is also called the "Object". The beam 41 is coupled to the spherical mirror 107 having focal length of 42.5 mm, where the beam 41 is on the axis of the spherical mirror 107 in an XZ plane, and off the axis by 11° in a YZ plane, or the plane of FIG. 4. An off-axis reflection from a spherical mirror causes coma aberration, in this case in the YZ plane. A collimated beam 41A is coupled in sequence to the T-DG 108 having 966 lines per mm, then to the retroreflector 50, and to the same T-DG 108 a second time. The beam 41A is incident on the T-DG 108 at near the Littrow angle. The combined effect of the T-DG 108 and the retroreflector 50 is to produce an angular dispersion of the narrowband sub-beams 42 to 44 of the light beam 41. The narrowband sub-beams 42 to 44 have central wavelengths of 1528 nm, 1546 nm, and 1568 nm, respectively. The dispersed collimated narrowband sub-beams 42 to 44 are coupled back to the spherical mirror 107, which now functions as a focusing coupler. The off-axis incidence at the spherical mirror 107 again causes coma in the YZ plane, and the sign of the coma is the same as for the first reflection from the spherical mirror 107, so the coma from the two reflections adds up. The now converging sub-beams 42 to 44 from the spherical mirror 107 are directed to the line of dispersion 48. For a use of the wavelength dispersing device 40 as a part of a wavelength selective optical switch (WSS), a plurality of switching elements or directors, e.g. a micro-electro-mechanical (MEMS) micromirror array or liquid crystal (LC) pixel array, should be disposed at the line of dispersion 48. Ideally, in a WSS application, the sub-beams 42 to 44 arrive at the switching elements, not shown, at a normal incidence in the YZ plane. This can be achieved by optimizing a distance from the T-DG 108 to the spherical mirror 107 to make the beams at the line of dispersion 48 substantially parallel to one another, and by setting the tilt of the line of dispersion 48 to be normal to the sub-beams 42 to 44. Furthermore, it is desirable that the narrowband sub-beams 42 to 44 are all substantially in focus at the line of dispersion 48, which can be achieved by optimizing the distances from the spherical mirror 107 to the object, or the input port 49, and to the "image", or the line of dispersion 48, to minimize the defocus variation over wavelength.

Figure 5:
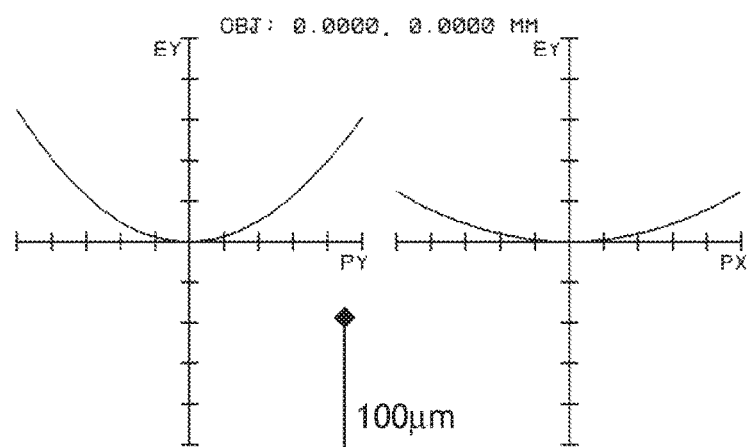
FIG. 5 is a ray fan for the wavelength dispersing device of FIG. 4.

Referring now to FIG. 5, ray fans for the wavelength dispersing device 40 at the wavelength of 1546 nm are shown. The wavelength of 1546 nm corresponds to the sub-beam 43 and the spot 46 in FIG. 4. The left plot in FIG. 5 shows the Y-direction lateral ray position error $E_y$ in microns, as a function of the Y-direction pupil coordinate $P_y$ normalized to ±1. This ray fan shows the quadratic shape characteristic of an aberration known in the art as "tangential coma". On the right-side plot of FIG. 5, $E_y$ is plotted against the X-direction pupil coordinate $P_x$, showing an aberration known in the art as "sagittal coma". The vertical scale in FIG. 5 is 100 μm. The maximum values of the tangential and sagittal coma are respectively about 60 μm and 20 μm. These are quite large values of coma causing severe penalties in channel shape and port-dependent coupling loss in a WSS device based on the wavelength dispersing device 40.

Figure 6:
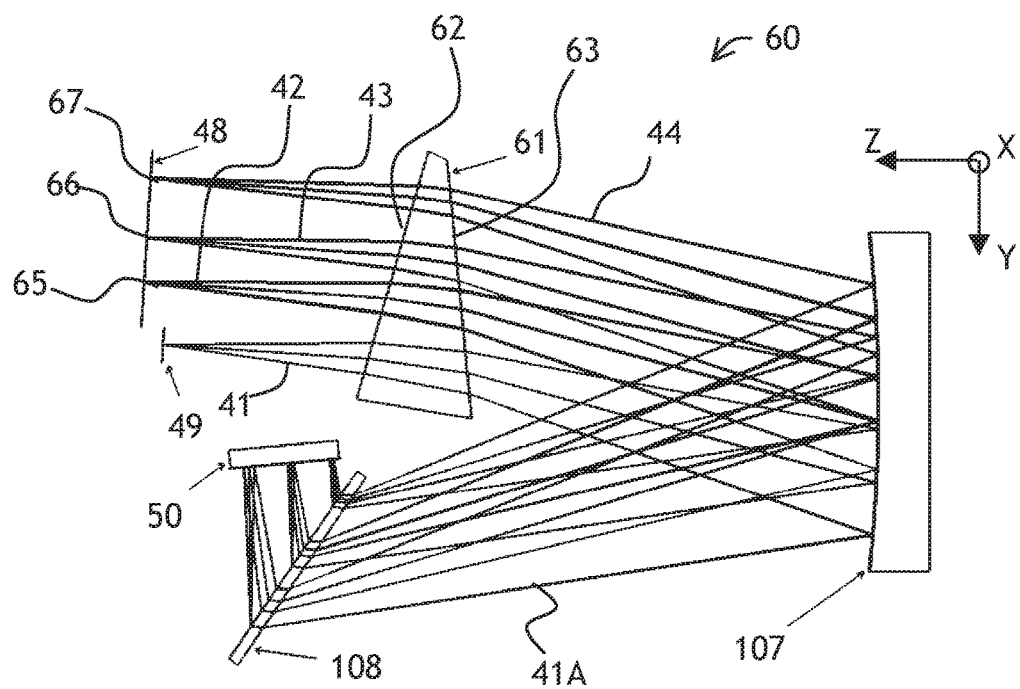
FIG. 6 is a plan view of a wavelength dispersing device of the present invention, having a coma-compensating wedge.

Turning to FIG. 6, a plan view of an off-axis wavelength dispersing device 60 of the present invention is shown. Similar to the wavelength dispersing device 40 of FIG. 4, the wavelength dispersing device 60 is used for dispersing the light beam 41 into the narrowband sub-beams 42 to 44 having focal spots 65 to 67 spaced apart along the line of dispersion 48. One difference between the wavelength dispersing device 60 of FIG. 6 and the wavelength dispersing device 40 of FIG. 4 is that an optical wedge 61 is disposed in an optical path of the diverging light beam 41 between the input port 49 and the spherical mirror 107 and in an optical path of the converging narrowband sub-beams 42 to 44 between the spherical mirror 107 and the line of dispersion 48. The optical wedge 61 of FIG. 6 is used for compensating coma of the spherical mirror 107. Using the wedge 61 results in the focal spots 65 to 67 of FIG. 6 being much narrower, on average, than the corresponding focal spots 45 to 47 of FIG. 4. The optical wedge 611 is made of fused silica and has two flat faces 62 and 63 disposed at an angle of 22° to one another. During optimization of the optical model, the distance between the line of dispersion 48 and the optical wedge 61 has been fixed, and object and image distances have been re-optimized to minimize the defocus over wavelength. The optical wedge 61 is preferably oriented at the minimum deviation angle for the optical beam 41, to minimize sensitivity of optical beams direction to orientation of the optical wedge 61.

Figure 7:
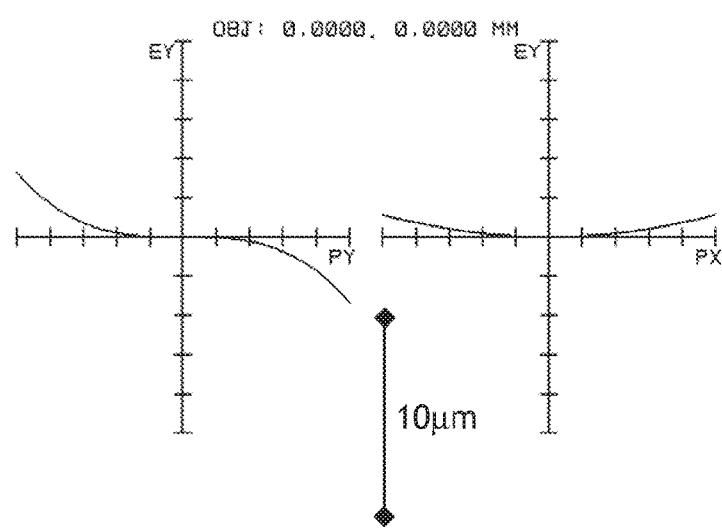
FIG. 7 is a ray fan for the wavelength dispersing device of FIG. 6.

Referring now to FIG. 7, ray fans for the wavelength dispersing device 60 at a wavelength of 1546 nm is shown. The wavelength of 1546 nm corresponds to the sub-beam 43 and the spot 66 in FIG. 6. The left plot in FIG. 7 shows the Y-direction lateral ray position error $E_y$ in microns as a function of the Y-direction pupil coordinate $P_y$ normalized to ±1. On the right-side plot of FIG. 7, $E_y$ is plotted against the X-direction pupil coordinate $P_x$. Note that the vertical scale in FIG. 7 is now ten times finer, that is 10 μm. The maximum values of the Y-direction ray error $E_y$ are now less than 4 μm, and primarily due to spherical aberration, which is evident from the cubic form of $E_y$ vs. $P_y$ in the left side plot of FIG. 7. Thus, with a wedge angle of 22°, the coma at 1546 nm resulting from the two passes of optical beams through the optical wedge 61 nearly exactly compensates the coma due to two off-axis reflections from the spherical mirror 107. As a result, an average width of focal spots 65 to 67 of the narrowband sub-beams 42 to 44, respectively, measured along the line of dispersion 48 connecting the focal spots 65 to 67, is reduced. The tilted surfaces of the wedge 61 do introduce some astigmatism into the wavelength dispersing device 60, but this is often not a major concern. When the wavelength dispersing device 60 is used as a part of a monochromator or a spectrograph, an input slit is extended in the X-direction, and in the case of a WSS, highly elliptical beams are preferably used, making the system relatively insensitive to the X-direction defocus. An embodiment of a WSS based on the wavelength dispersing device 60 will be described below, during discussion of FIG. 12.

Figure 8:
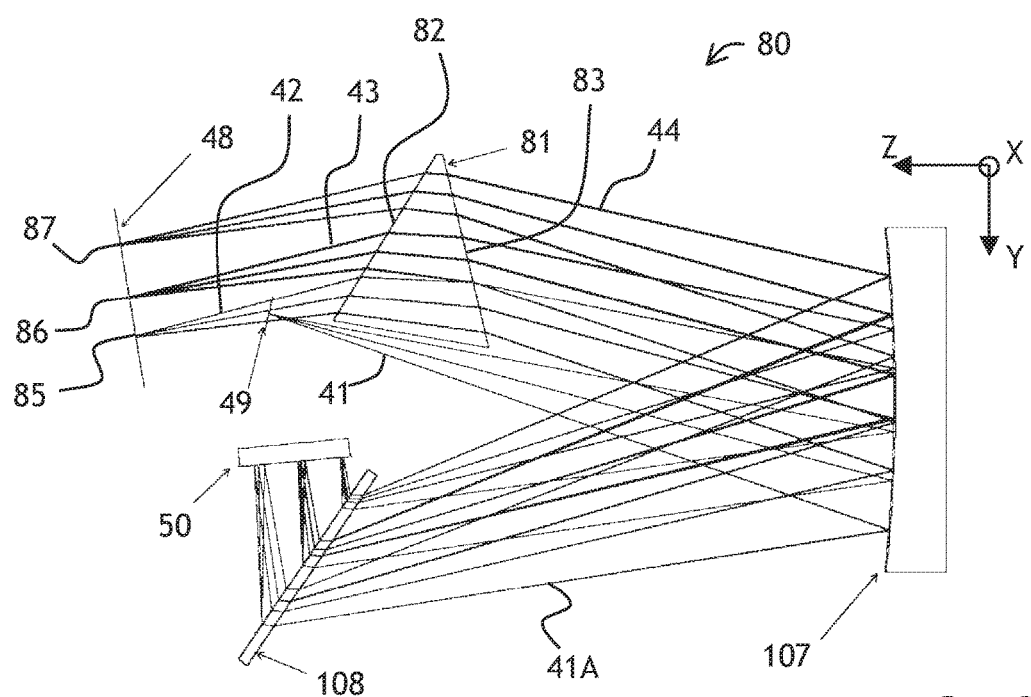
FIG. 8 is a plan view of a wavelength dispersing device of the present invention, having a coma-compensating wedge for sub-beams only.

Turning to FIG. 8, a plan view of an off-axis wavelength dispersing device 80 of the present invention is shown. Similar to FIGS. 4 and 6, the wavelength dispersing device 80 is used for dispersing the light beam 41 into the narrowband sub-beams 42 to 44 having focal spots 85 to 87 spaced apart along the line of dispersion 48. One difference between the wavelength dispersing device 80 of FIG. 8 and the wavelength dispersing device 60 of FIG. 6 is that an optical wedge 81 is disposed only in an optical path of the converging narrowband sub-beams 42 to 44 between the spherical mirror 107 and the line of dispersion 48, and the beam 41 impinges directly onto the mirror 107 in FIG. 8. The optical wedge 81 of FIG. 8 is used for compensating coma of the spherical mirror 107. Using the wedge 81 results in the focal spots 85 to 87 in FIG. 8 being narrower than the corresponding focal spots 45 to 47 of the narrowband sub-beams 42 to 44 of FIG. 4. The optical wedge 81 is made of fused silica and has two flat faces 82 and 83 disposed at an angle of 48° to each other. To arrive at the arrangement of FIG. 8, the distance between the line of dispersion 48 and the optical wedge 81 has been fixed, and object and image distances have been re-optimized to minimize the defocus over wavelength. The optical wedge 81 is preferably oriented at the minimum deviation angle for the narrowband sub-beams 42 to 44, to minimize sensitivity of direction of the sub-beams 42 to 44 to orientation of the optical wedge 81. The wedge angle of the wedge 81 of the wavelength dispersing device 80 of FIG. 8 is larger than the corresponding wedge angle of the wedge 61 in the wavelength dispersing device 60 of FIG. 6, because there is only one pass through the wedge 81 to effect the required coma compensation.

Figure 9:
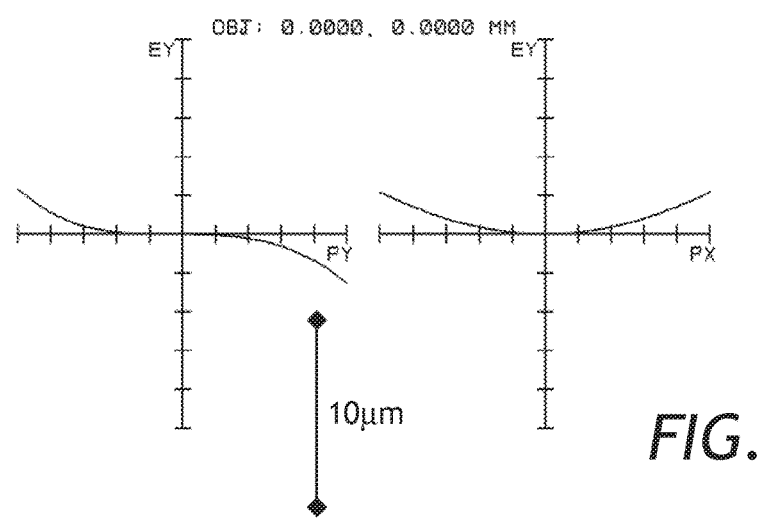
FIG. 9 is a ray fan for the wavelength dispersing device of FIG. 8.

Turning now to FIG. 9, ray fans corresponding to the wavelength dispersing device 80 of FIG. 8 are presented. The ray fans are at the wavelength of 1546 nm, which corresponds to the sub-beam 43 and the spot 86 in FIG. 8. The ray fans of FIG. 9 show that the maximum Y-direction ray error $E_y$ is reduced to less than 3 μm. The vertical scale in FIG. 9 is 10 μm. The optical wedge 81 nearly exactly compensates the coma from two off-axis reflections from the spherical mirror 107, so that an average width of focal spots 85 to 87 of the narrowband sub-beams 42 to 44, respectively, measured along the line of dispersion 48, is reduced. It will be obvious to those skilled in the art that some degree of coma compensation could be also be achieved with an optical wedge of this second embodiment disposed in the diverging optical beam 41 instead of the converging narrowband sub-beams 42 to 44.

Figure 10:
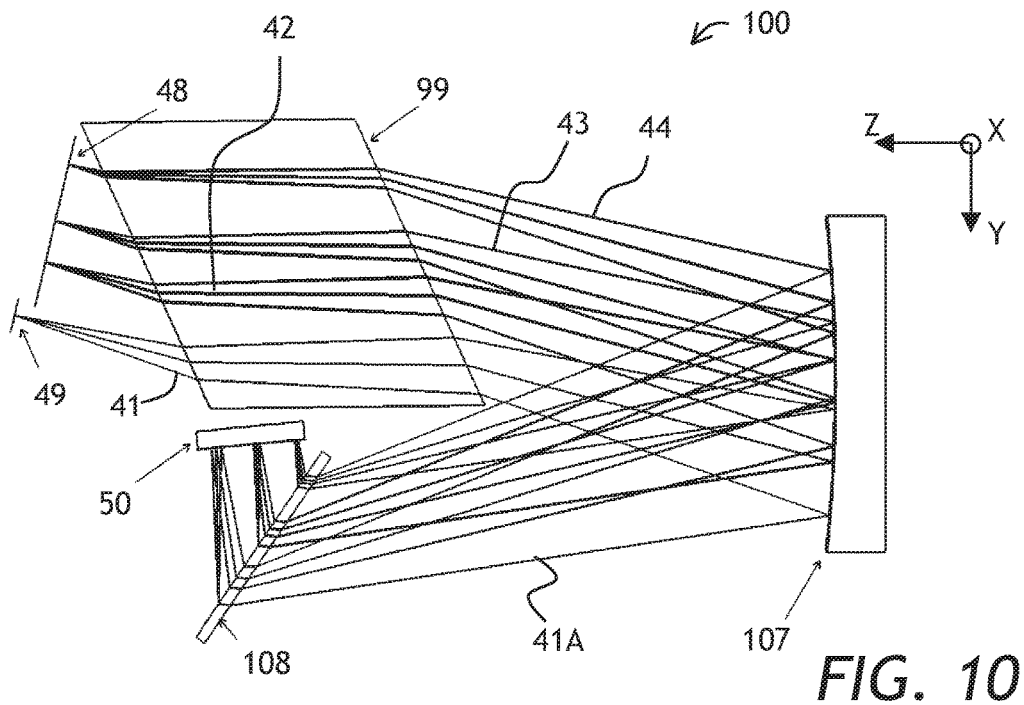
FIG. 10 is a plan view of a wavelength dispersing device of the present invention, having a coma-compensating plano-parallel plate.

Referring to FIG. 10, a plan view of an off-axis wavelength dispersing device 100 of the present invention is shown. One difference between the wavelength dispersing device 100 of FIG. 10 and the wavelength dispersing device 80 of FIG. 8 is that a plano-parallel plate 99 is used instead of the optical wedge 81. During optical modeling, the object and image distances have been optimized to minimize defocus over wavelength, and the angle and thickness of the plano-parallel plate 99 in this example have been optimized to 40° and 15 mm, respectively, to substantially compensate the coma from the rest of the wavelength dispersing device 100.

Figure 11:
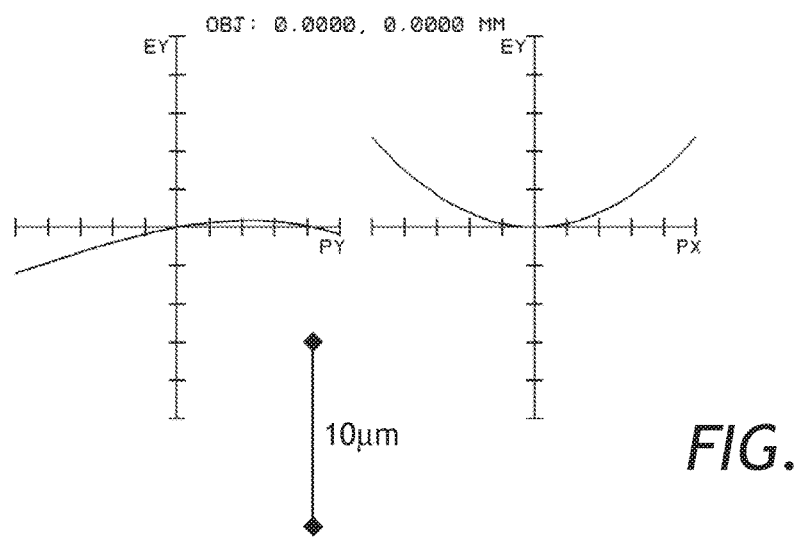
FIG. 11 is a ray fan for the wavelength dispersing device of FIG. 10.

Turning now to FIG. 11, corresponding ray fans for the wavelength dispersing device 100 at 1.546 nm are presented. The vertical scale in FIG. 11 is 10 µm. The maximum value of Y-direction ray error $E_y$ is now less than 5 µm. Compared to the embodiment of FIG. 6, this embodiment may be less convenient in practice due to the large angles of incidence at the plano-parallel plate 99, and the large required thickness of the plano-parallel plate 99. It will be obvious to those skilled in the art that some degree of coma compensation could also be achieved with a tilted plano-parallel plate disposed in the diverging object beam 41 only, or the converging image beams 42 to 44 only.

In this foregoing embodiments, near-Littrow spectrometer configurations were presented using a single spherical mirror 107 as a focusing coupler having optical power in a plane containing the line of dispersion 48. The object of a coma-correcting prism or wedge, such as the wedges 61, 81, or the plano-parallel plate 99, is to produce a coma of opposite sign to the net coma from the rest of the optical system, which is frequently dominated by the coma of the spherical mirror 107. It will be obvious to one skilled in the art that the invention is also effective in compensating coma produced by any focusing coupler, such as an aspherical mirror, or a toroidal mirror, or a cylindrical mirror in place of the spherical mirror 107. Furthermore, a transmissive lens of spherical, aspherical, toroidal, cylindrical, gradient index, or other form may produce coma when used off-axis, and the disclosed invention is effecting in correcting for coma from such a lens as well. Further, a diffraction grating or a diffractive optical element having a curved surface may produce coma, and the disclosed invention is effective in correcting for coma from such a diffractive optical element. A complete spectrometer optical system may contain one or more curved mirrors, or one or more lenses, or one or more diffractive surfaces, which together perform an imaging function. Since one object of the invention is to counteract the net system coma, the invention is effective in coma compensation for such a multi-surface imaging system. In particular, the invention can be applied to coma present in Czerny-Turner, Ebert-Fastie, Monk-Gillieson, Rowland circle, or Wadsworth spectrometer configurations.

Figure 12:
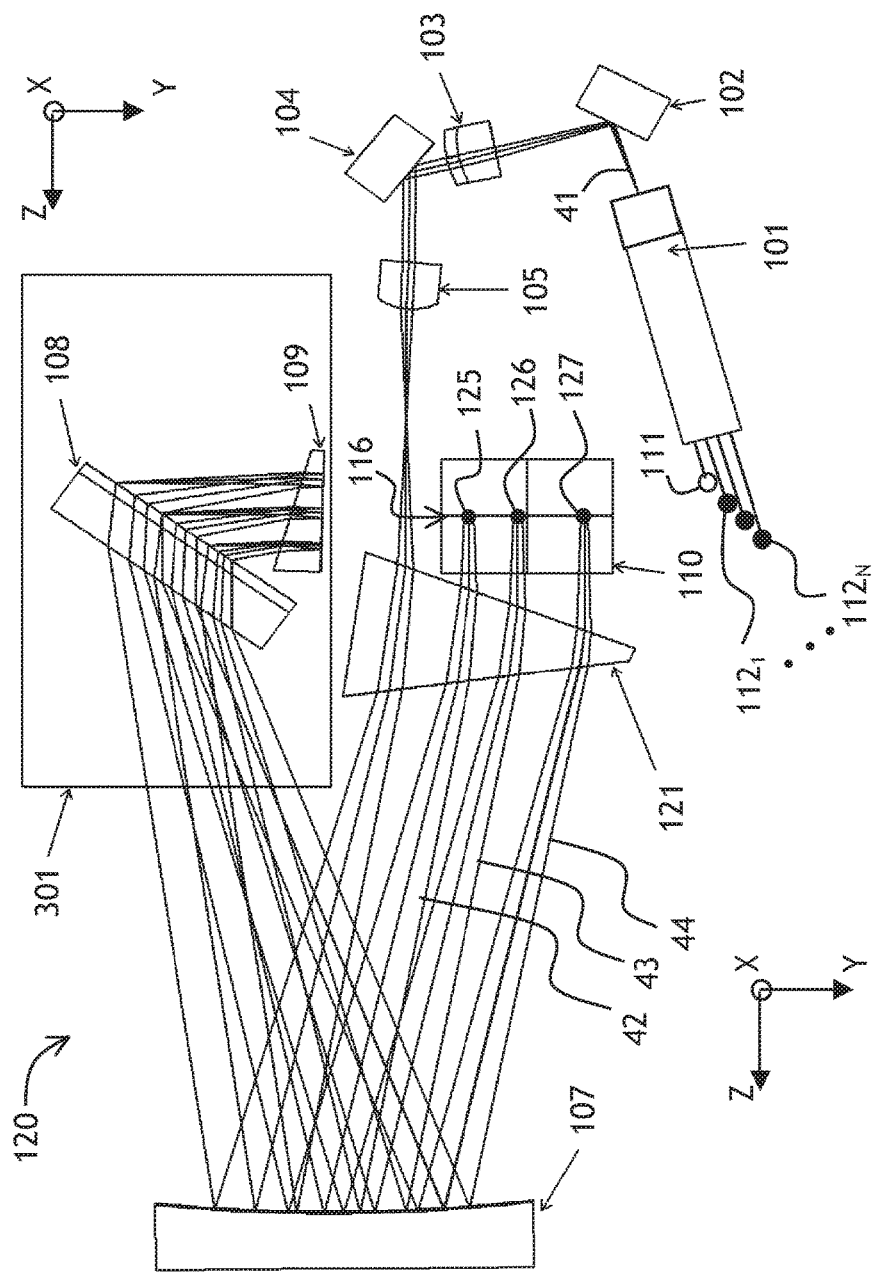
FIG. 12 is a plan view of a wavelength selective optical switch (WSS) of the present invention, having a coma-compensating wedge.

Referring now to FIG. 12, a plan view of a WSS 120 of the present invention is shown. The WSS 120 is based on the wavelength dispersing device 60 of FIG. 6. The WSS 120 has a front end 101 having an input port 111 and a plurality of output ports $112_1$ to $112_N$, a first turning mirror 102, a first cylindrical lens 103, a second turning mirror 104, a second cylindrical lens 105, a coma-compensating wedge 121, the concave mirror 107, a dispersive unit 301 having the T-DG 108 and a retroreflector 109, and an array of directors 110. The WSS 120 functions to switch wavelength channels between the input port 111 and any particular of the output ports $112_1$ to $112_N$ independently on each other. The retroreflector 109 is an alternative embodiment of the retroreflector 50 of FIGS. 4, 6, 8, and 10. The light beam 41 in this embodiment carries the wavelength channels of the WSS 120. The light beam 41 is launched into the input port 111, is directed by the first and the second turning mirrors 102 and 104, respectively, and is focused by the first and the second cylindrical lenses 103 and 105, respectively. Then, the beam 41 passes through the coma-compensating wedge 121 and is directed by the concave mirror 107 toward the T-DG 108. The T-DG 108 disperses the beam 41 into a fan of the narrowband sub-beams 42 to 44 carrying the individual wavelength channels. Again, the term "narrowband" is understood as having a narrow wavelength range as compared to a wavelength range of the light beam. By way of a non-limiting example, a wavelength range, or a bandwidth of a single wavelength channel is about 0.4 nm, whereas the wavelength range of the light beam 18 is about 32 nm. The narrowband sub-beams 42 to 44 dispersed by the T-DG 108 are reflected by the retroreflector 109 back to the T-DG 108, for additional dispersing by the T-DG 108, after which the narrowband sub-beams 42 to 44 are directed back towards the concave mirror 107, which reflects them and focuses them on the array of directors 110 through the coma-compensating wedge 121. The function of the coma-compensating wedge 121 is to compensate for coma of the concave mirror 107, thereby reducing an average width of focal spots 125 to 127 of the narrowband sub-beams 42 to 44, respectively, on the director array 110. The width is measured along a line 116 connecting the focal spots 125 to 127. The array of directors 110 redirects the narrowband sub-beams 42 to 44 to propagate back through the WSS 120 towards the output ports so as to couple each of the narrowband sub-beams 42 to 44 into a particular of the output ports $112_1$ to $112_N$, depending upon an angle at which the narrowband sub-beams 42 to 44 are redirected by the array of directors 110.

Note that the actual wavelengths of the sub-beams 42 to 44 may deviate from the previously stated values of 1528, 1546, and 1568 nm. It is to be understood that, for a WSS application, the wavelengths of the narrowband sub-beams 42 to 44 are selected to correspond to the International Telecommunications Union (ITU) wavelengths grid.

Further, various obvious modifications of the optical dispersing devices 40, 60, 80, 100, and of the WSS 120 are of course possible. For example, the concave mirror 107 can be replaced with any other focusing coupler that has optical power, i.e. a capability to focus light, in a plane containing the line of dispersion 48, or in a dispersion plane of the T-DG 108. With regards to the latter, any other dispersive unit, such as a single-pass or a double-pass reflection diffraction grating, may be used. Double passing light through a diffraction grating is preferable because it doubles the angular dispersion, which is usable for optics size reduction as explained above.

According to another aspect of the present invention, one can reduce the size of a wavelength dispersing device and a WSS based thereupon by providing a single folding mirror which, due to its location in the optical train, folds the optical path at least three times.

Figure 13:
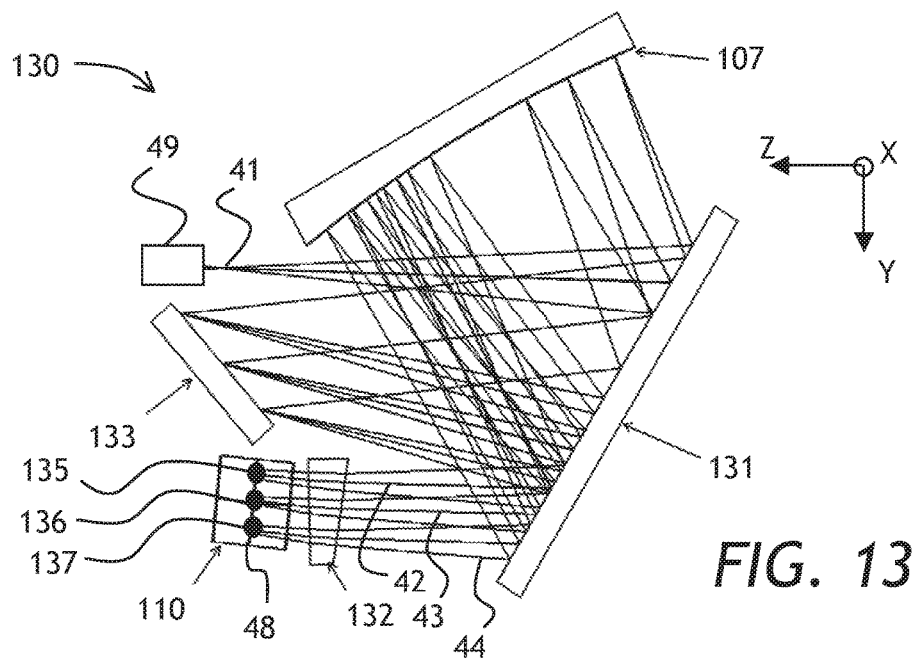
FIGS. 13 to 16 are plan views of various embodiments of a wavelength dispersing device and a WSS of the present invention, having a single folding mirror.

Referring now to FIG. 13, a wavelength dispersing device 130 has a folding mirror 131 for folding the optical path four times in this case, a prism 132 for correcting some aberrations, a diffraction grating 133, as well as the previously introduced concave mirror 107 and the input port 49 for inputting the light beam 41. The folding mirror 131 is disposed in optical paths between: 1) the input port 49 and the concave mirror 107; 2) the concave mirror 107 and the diffraction grating 133; 3) in another optical path, the diffraction grating 133 and the concave mirror 107; and 4) the concave mirror 107 and the line of dispersion 48. Therefore, the folding mirror 131 folds the total optical path four times.

Figure 1:
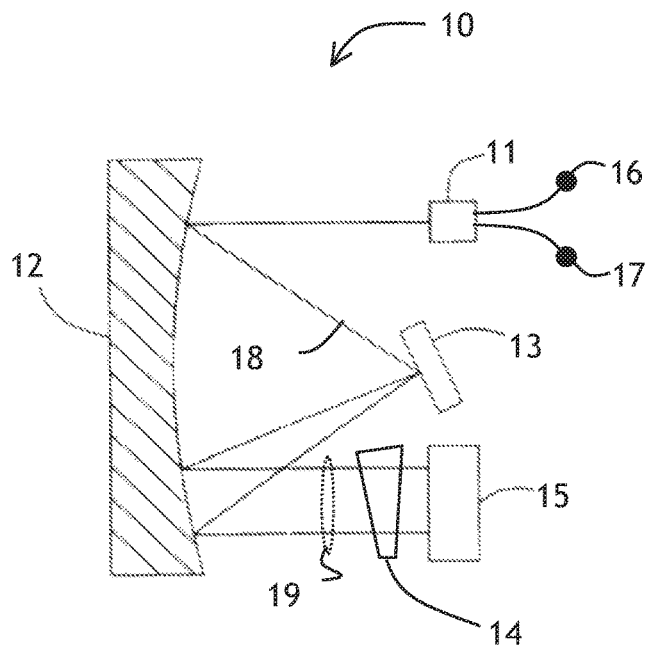
FIG. 1 is a plan view of a prior-art wavelength selective optical switch.
Figure 2:
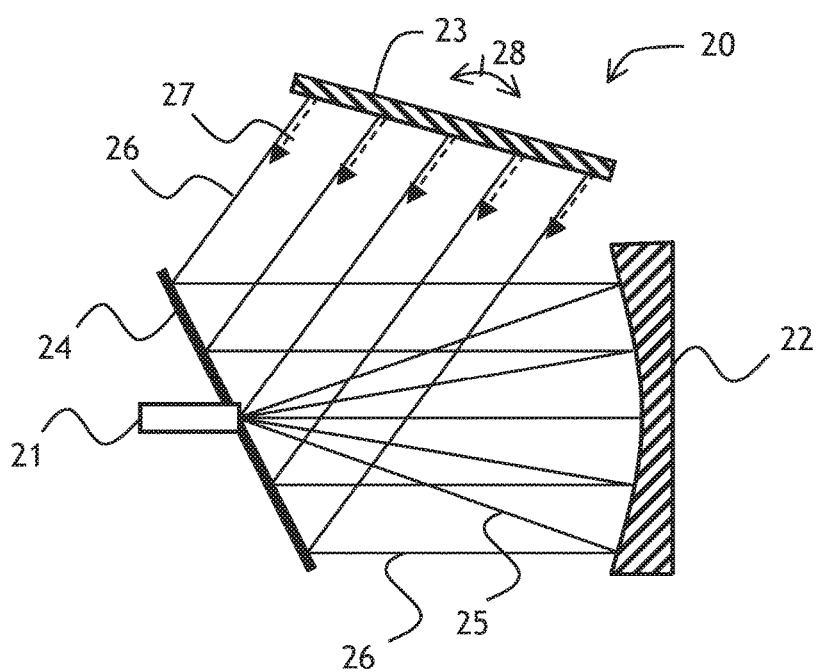
FIG. 2 is a plan view of a prior-art monochromator having a folding mirror.
Figure 3:
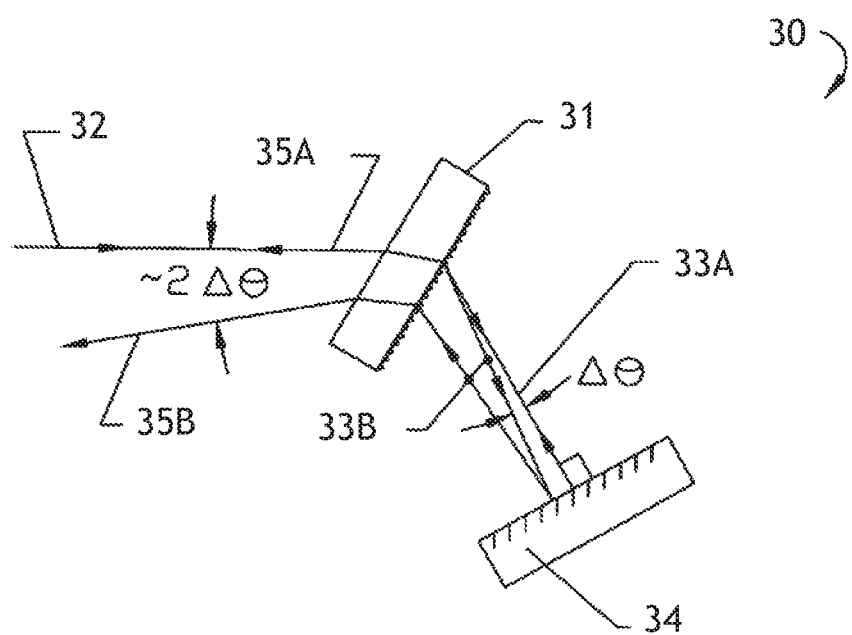
FIG. 3 is a plan view of a prior-art double-pass arrangement for a transmission diffraction grating (T-DG)

With the array of directors 110, the wavelength dispersive device 130 can be used as a WSS, which is more compact than the prior-art WSS 10. Indeed, in the WSS of the present invention based on the wavelength dispersing device 130 has the optical path folded four times by the use of the folding mirror 131, whereby a significant size reduction in comparison to a size of the prior-art WSS 10 is achieved. The wavelength dispersing device 130 is similar to the wavelength dispersing device 80 of FIG. 8, wherein coma mostly due to off-axis reflections from the concave mirror 107 is compensated by the coma compensating optical wedge 81. In FIG. 13, the wedge 132 is constructed so as to compensate for the coma due to off-axis reflections from the concave mirror 107. Thus, the wedge 132 is not equivalent to the prior-art wedge 14 in FIG. 1, because the wedge angle of the prior-art wedge 14 is selected so as to compensate for on-axis spherical aberration or field curvature, whereas the wedge angle of the wedge 132 is selected to compensate for coma.

In operation, the light beam 41 emitted by the input port 49 is coupled to the folding mirror 131; from the folding mirror 131 to the concave mirror 107, is collimated thereby, and then is directed, after another reflection from the folding mirror 131, towards the diffraction grating 133 that disperses the light beam 41 into narrowband sub-beams 42 to 44. The narrowband sub-beams 42 to 44 are coupled back to the folding mirror 131; from the folding mirror 131 to the concave mirror 107 that makes the narrowband sub-beams 42 to 44 parallel to each other and focuses them. From the concave mirror 107, the narrowband sub-beams 42 to 44 propagate back to the folding mirror 131 for the fourth time; and from the folding mirror 131 to a focal plane containing the line of dispersion 48, wherein the narrowband sub-beams 42 to 44 are focused into focal spots 135 to 137, respectively.

Figure 14:
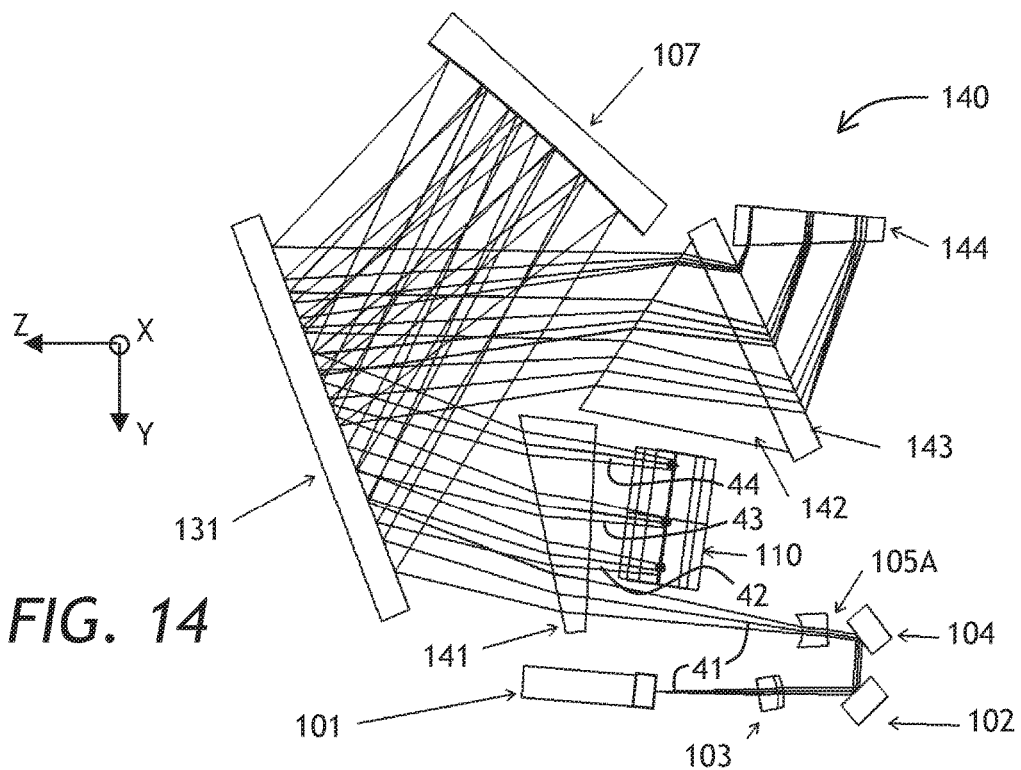

Turning to FIG. 14, a plan view of an embodiment of a compact WSS 140 of the present invention is shown. The WSS 140 is based on a wavelength dispersing device having a Littrow mount of a double-passed transmissive diffraction grating 143. In the WSS 140 of FIG. 14, the light beam 41 emitted by the front end 101 is coupled to the first lens 103 for an angle-to-offset transformation in the XZ plane; to the first turning mirror 102; to the second turning mirror 104; and to a negative cylindrical lens 105A that re-images the light beam 41 in the YZ plane forming a virtual image behind, or upstream of the lens 105A. Then, the light beam 41 passes through a first wedge 141 that corrects for some aberrations and impinges on the folding mirror 131, after which it impinges on the spherical mirror 107 that collimates the light beam 41. Then, the light beam 41 propagates back to the folding mirror 131; to a second wedge 142; to the T-DG 143 that produces an additional to the second wedge 142 angular dispersion of the light beam 41 into the narrowband sub-beams 42 to 44. Then, the narrowband sub-beams 42 to 44 propagate to a retroreflector 144 that has a mirrored surface on its back; back to the T-DG 143; back to the second wedge 142; back to the folding mirror 131; back to the spherical mirror 107, which now functions as a focusing means; back to the folding mirror 131; and back to the first wedge 141. Then, the narrowband sub-beams 42 to 44 propagate to the director array 110, which is preferably a MEMS switching engine. Note that the first and the second turning mirrors 102 and 104 each turn a path of the optical beam 41 once, whereas the folding mirror 131 folds the entire optical path between the front end 101 and the director array 110 four times. The narrowband sub-beams 42 to 44 redirected by the director array 110 propagate back through the WSS 140, being reflected from the folding mirror 131 four more times, and finally get coupled into a particular one of output ports, not shown, of the front end 101. The retroreflector 144 is another embodiment of the retroreflector 109 of FIG. 12.

Figure 15:
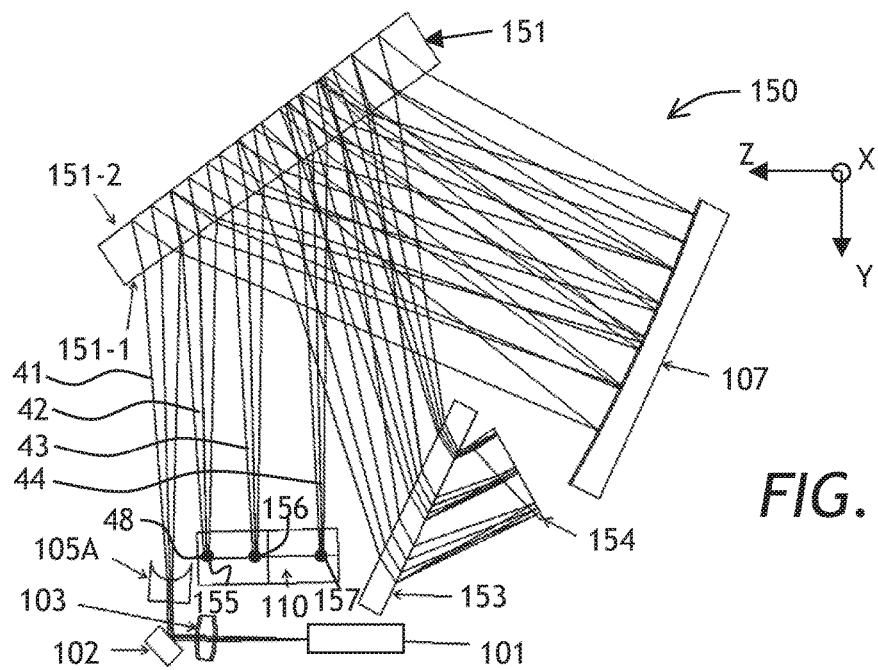

Referring now to FIG. 15, a plan view of an embodiment of a compact WSS 150 of the present invention is shown. The WSS 150 operates similar to the WSS 140 of FIG. 4, with two main differences. First, a transmission grating 153 does not have a prism attached to it, and second, a folding mirror 151 has a flat refractive surface 151-1 and a flat reflective surface 151-2, on that in operation, the light beam 41 and the narrowband sub-beams 42 to 44 first impinge on the flat refractive surface 151-1, then on the flat reflective surface 151-2, and then again on the flat refractive surface 151-1. As a result, coma of the WSS 150 is lessened, so that an average width of focal spots 155 to 157 measured along the line of dispersion 48 can be reduced. Coma of the WSS 150 is dominated by coma of the concave spherical mirror 107. The mechanism of coma reduction in the WSS 150 of FIG. 15 is the same mechanism as the one used in the wavelength dispersing device 60 of FIG. 6 or in the WSS 120 of FIG. 12. A dielectric reflector is preferably used for the flat reflective surface 151-2. A total internal reflection (TIR) can also be employed. In the latter case, the folding mirror 151 is manufactured as an optical wedge having such an index of refraction that the optical beam 41 and the narrowband sub-beams 42 to 44 are reflected from the surface 151-2 by TIR. The surface 151-1 is preferably antireflection (AR) coated.

Figure 16:
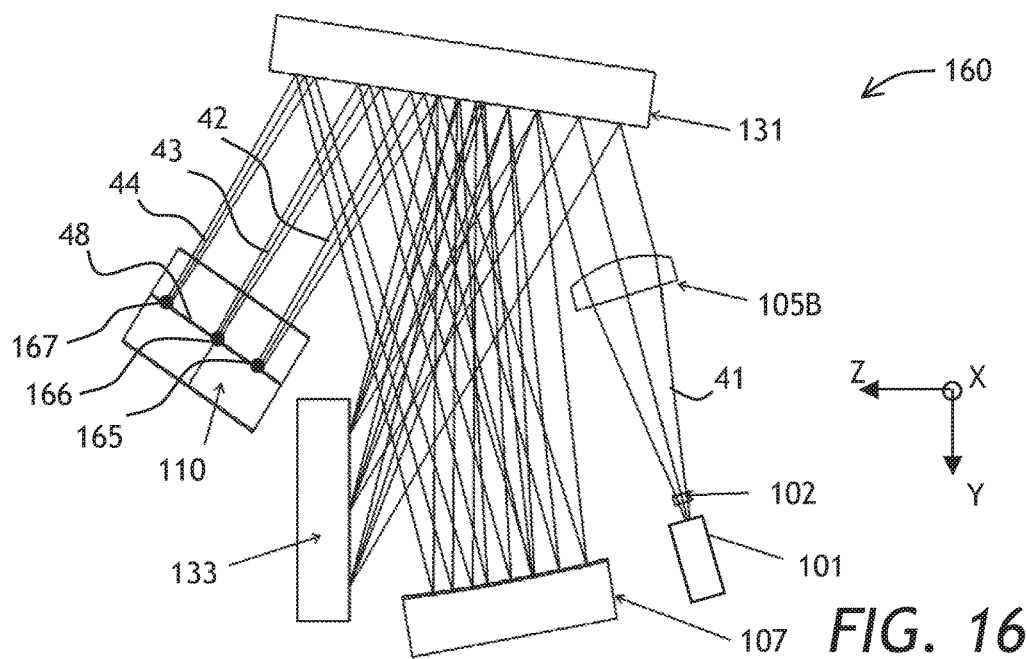

Referring now to FIG. 16, a plan view of an embodiment of a compact WSS 160 of the present invention is shown. The WSS 160 is similar to the WSS 130 of FIG. 13, except it does not have a coma-correcting prism or wedge, and the optical beam 41 is directed by the folding mirror 131 not to the concave mirror 107, and then to the diffraction grating 133, but straight to the diffraction grating 133. In the WSS 130 of FIG. 13, the concave mirror 107 functions to collimate the optical beam 41, whereas in the WSS 160 of FIG. 6, the function of collimation is performed by a separate lens 105B. In operation, the light beam 41 emitted by the front end 101 is coupled, after being refracted by the lenses 102 and 105B, to the folding mirror 131; from the folding mirror 131 to the diffraction grating 133 that disperses the light beam 41 into narrowband sub-beams 42 to 44. The narrowband sub-beams 42 to 44 are coupled back to the folding mirror 131, and from the folding mirror 131 they are coupled to the concave mirror 107 that makes the narrowband sub-beams 42 to 44 parallel to each other and focuses them. From the concave mirror 107, the narrowband sub-beams 42 to 44 propagate back to the folding mirror 131, and from the folding mirror 131 to a focal plane containing the line of dispersion 48, wherein the narrowband sub-beams 42 to 44 are focused into focal spots 165 to 167, respectively. Thus, the folding mirror 131 is disposed in optical paths between: 1) the front end 101 and the diffraction grating 133; 2) the diffraction grating 133 and the concave mirror 107; and 3) the concave mirror 107 and the line of dispersion 48. The folding mirror 131 folds the optical path between the front end 101 and the director array 110 three times. A dielectric reflector is preferably used to provide a high reflectivity of the folding mirror 131.

According to another aspect of the present invention, one can reduce size of a wavelength dispersing device and a WSS based thereupon by providing a double passed diffraction grating, in particular a double-passed T-DG. Increased wavelength dispersion due to the double pass arrangement allows reduction of the focal length of a concave mirror, whereby the size of the entire device can be further reduced. As has been pointed out above, however, the prior-art double-pass approach suffers from the drawback of multiple stray reflections, which deteriorate optical performance of a wavelength dispersing device.

Figure 17:
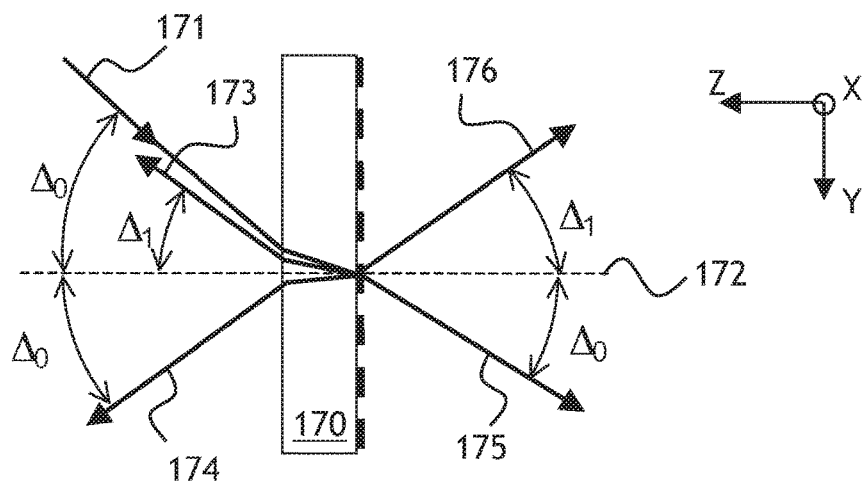
FIG. 17 is an optical diagram showing stray optical beams reflected, transmitted, and diffracted by a T-DG.

Turning now to FIG. 17, an optical diagram showing various optical beams reflected and diffracted by a T-DG 170 is presented. A beam 171 is incident on the T-DG 170 in the YZ plane at an angle of incidence $\theta_0$ relative to a grating normal 172. It is assumed that the T-DG 170 has parallel grating lines and only supports the zeroth and a "−1", herein called "the first", order of diffraction. The beam 171 is split by the T-DG 170 into a "reflection-diffracted" beam 173, a reflected zeroth order beam 174, a transmitted zeroth order beam 175, and a desired "transmission-diffracted" beam 176. The two zeroth order beams 174 and 175 are at an angle $\theta_0$ to the grating normal 172, while the two diffracted beams 173 and 176 are at an angle $\theta_1$ to the grating normal 172. The magnitude of the diffraction angle $\theta_1$ may be calculated from the following grating equation:

$$\sin\vartheta_1 = \sin\vartheta_0 - \lambda/d \quad (1)$$

wherein $\lambda$ is wavelength of the incoming light beam 171, and d is groove spacing of the T-DG 170.

From the viewpoint of building a spectrometer using the T-DG 170, the zeroth order beams 174 and 175, as well as the reflection-diffracted beam 173 are stray beams that need to be blocked. In many cases, these stray beams are widely separated from the incident beam 171 and the desired transmission-diffracted beam 176, so they can be easily blocked. However, in a practically important case when the angle of incidence $\theta_0$ is near the Littrow angle as is the case in FIG. 17, the reflection-diffracted beam 173 returns with only a small angle to the incident beam 171, making it difficult to block the reflection-diffracted beam 173.

Figure 18:
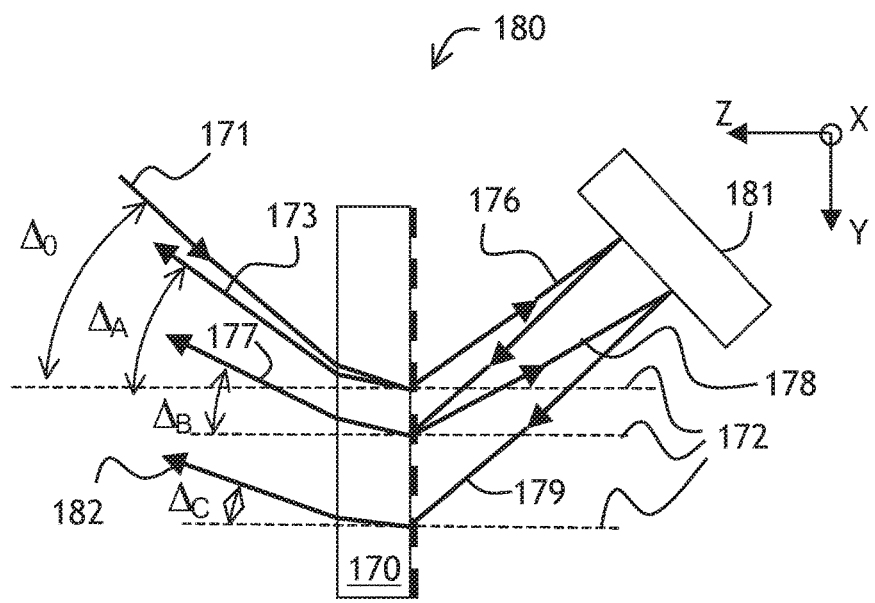
FIG. 18 is a plan view of a double-pass arrangement for a T-DG of FIG. 17, showing stray optical beams reflected and diffracted in the first order of diffraction by a T-DG.

The problem of suppressing stray beams becomes more complicated when the T-DG 170 is used in a double-pass configuration desirous in the present invention for size-reduction purposes as is explained above. Turning now to FIG. 18, a plan view, in the YZ plane, of a dispersive unit 180 for spatially separating a optical beam into narrowband sub-beams is presented. The dispersive unit 180 has the T-DG 170 and a retroreflector 181 optically coupled to the T-DG 170. In the following discussion, the zeroth order beams are neglected. In operation, the incoming optical beam 171 is diffracted by the T-DG 170 in two first-order diffracted beams: the transmission-diffracted beam 176 and the reflection-diffracted beam 173. The transmission-diffracted beam 176 is reflected by the retroreflector 181 to impinge again on the T-DG 170, at which point it splits again into an output transmission-diffracted beam 177 and into a stray reflection-diffracted beam 178, which is reflected again by the retroreflector 181 to form a stray beam 179 that is transmission-diffracted again by the T-DG 170 to form a stray beam 182. The output transmission-diffracted beam 177 has an angle of diffraction of $\theta_b$, whereas the reflected and transmitted stray beams 173 and 182 have angles of diffraction of $\theta_a$ and $\theta_c$, respectively. When a $\theta_a \approx \theta_b \approx \theta_c$, as is the case in FIG. 18, the stray beams are difficult to intercept. Indeed, turning to FIG. 19A, which is a side view, or XZ-plane view, of an embodiment 190A of the double-pass arrangement 180 of FIG. 118, all the beams coincide in the side view of FIG. 19A and are parallel to the grating normal 172 and to a mirror normal 191 and are perpendicular to a direction of grating lines denoted at 198A.

According to the present invention, the problem of suppressing stray optical beams is ameliorated by introducing a tilt of either the T-DG 170, or the retroreflector 181, or both. An equation for out-of-plane diffraction by the T-DG 170 disposed in the XY plane can be recorded as $$k_{my} = k_{iy} + m \cdot 2\pi/d; \quad k_{mx} = k_{ix} \quad (2)$$

where the grating lines are parallel to the X axis, $k_x$, $k_y$, and $k_z$ are the wavevector components, "i" indicates "incidence", and m is an order of diffraction. The case when $k_x$ is zero is most commonly used, and is known as the "classical diffraction mount". The case when $k_x$ is non-zero is known as the "conical diffraction mount", since the directions of the diffracted orders are disposed on a cone. For small $k_x$ and a limited range of angles of diffraction, one can make a simplifying approximation that the diffracted directions still lie in a plane that is tilted with respect to the grating lines.

Figure 19A:
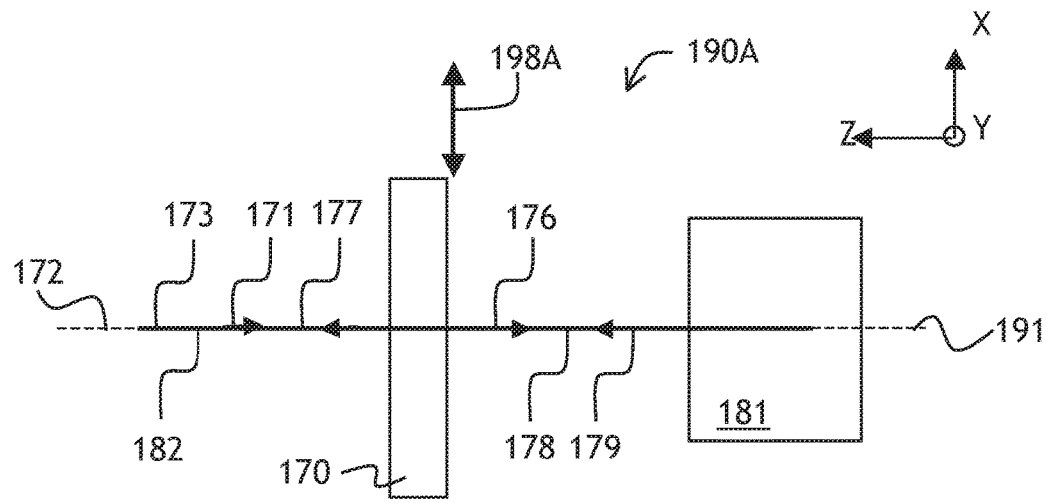
FIGS. 19A, B, and C are side views of various embodiments of a double-pass arrangement for a T-DG of FIG. 17.
Figure 19B:
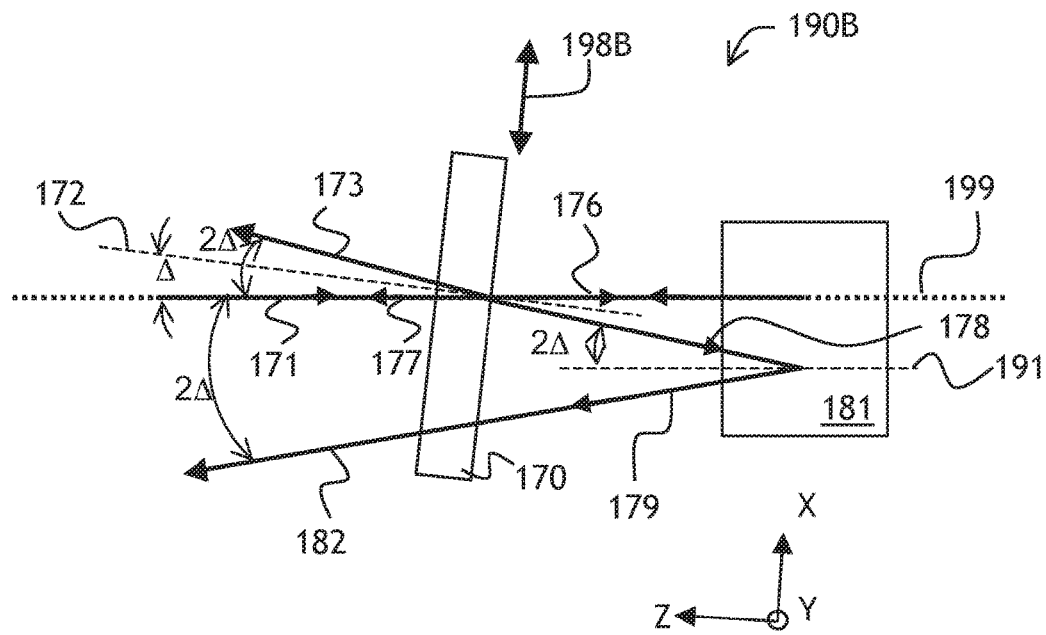

Referring now to FIG. 19B, a view in the XZ-plane of an embodiment 190B of the dispersive unit 180 of FIG. 18 is presented. In the embodiment 190B, the T-DG 170 is tilted about the Y-axis at an angle γ with respect to the incoming beam 171. The transmission-diffracted beams 176 and 177 will remain parallel to the incoming beam 171, while the stray beams 173 and 182 that were reflection-diffracted form the T-DG 170 at least once, will exit the T-DG 170 at an angle of 2γ to a plane of dispersion 199, which is parallel to the YZ plane. Note that the incoming beam 171 is not perpendicular to a direction of grating lines 198B.

Figure 19C:
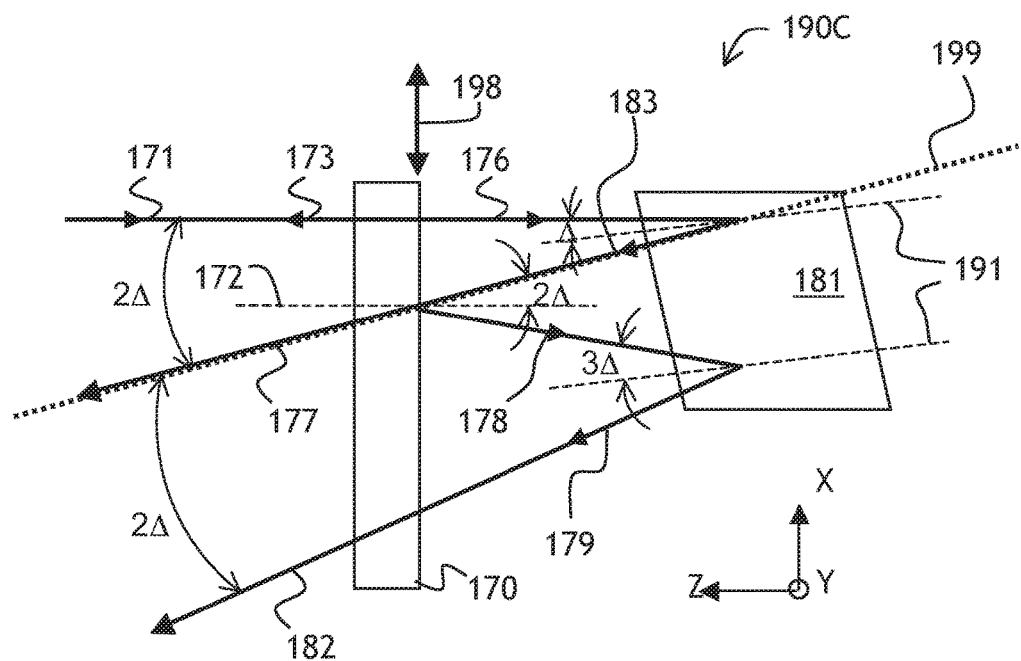

Referring now to FIG. 19C, a view in the XZ-plane of an embodiment 190C of the dispersive unit 180 of FIG. 18 is presented. In the embodiment 190C, the T-DG 170 is not tilted with respect to the incoming beam 171, but the retroreflector 181 is tilted about the Y-axis by the angle γ with respect to the incoming beam 171. Since the retroreflector 181 is tilted by γ, the transmission-diffracted beam 176 will be reflected at an angle of 2γ as a beam 183, and upon transmission-diffracting the second time, will exit as the output transmission-diffracted beam 177 in the plane of dispersion 199. As can be gleaned from FIG. 19C by comparing the angles of reflection, both stray beams 173 and 182 form an angle of 2γ with respect to the output beam 177 and the corresponding plane of dispersion 199. Therefore, in both embodiments 190B and 190C, the stray beams 173 and 182 exit at angles of 2γ with respect to the plane of dispersion 199, whereby they can be easily suppressed. Note that the beam 183 is not perpendicular to a direction of grating lines 198C.

Therefore, in both cases of the embodiments 190B and 190C of FIGS. 19B and 19C, at least one of the narrowband sub-beams impinging on the T-DG 170 is not perpendicular to the grating lines as denoted at 198B and 198C. In case of the embodiment 190B of FIG. 19B, such a narrowband sub-beam is in the incoming beam 171, and in case of the embodiment 190C of FIG. 19C, it is the reflected beam 183. To fulfill the condition of non-perpendicularity, a plane of T-DG 170 should not be perpendicular to the plane of incidence of the incoming optical beam 171 on the T-DG 170. Alternatively, a plane of the retroreflector 181 should not be perpendicular to the plane of incidence of the incoming optical beam 171 on the T-DG 170. Both conditions, of course, may apply as well.

The embodiments 190B and 190C of FIGS. 19B and 19C are preferable over the embodiment 190A of FIG. 19A, because they allow for easier stray light rejection. In the embodiments 190B and 190C, stray optical beams resulting from stray reflections from the diffraction grating 180 form a non-zero angle with the plane of dispersion 199, which is parallel to the output beam 177 and the YZ plane in FIG. 19B, and is parallel to the output beam 177 in FIG. 19C.

Figure 20:
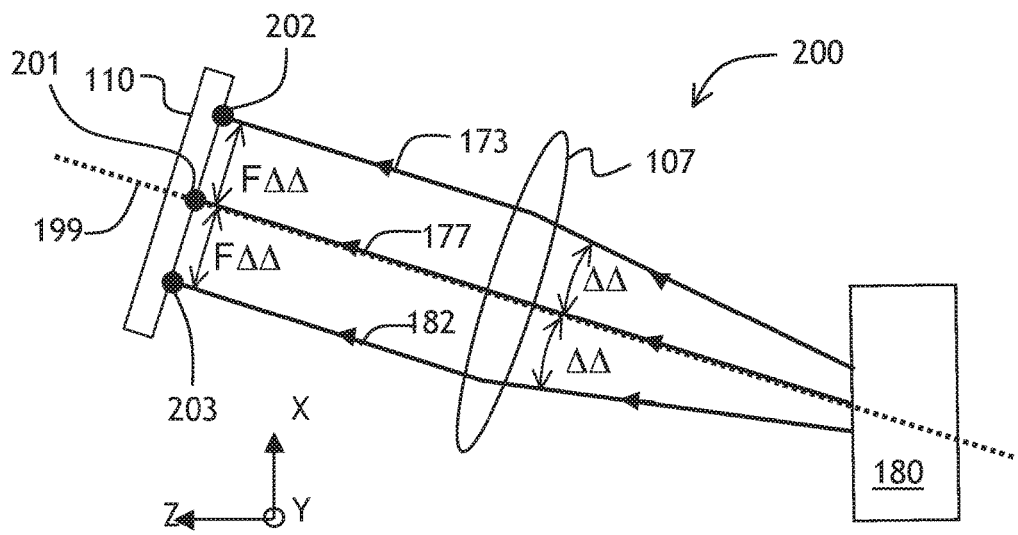
FIG. 20 is a plan view of a section of a wavelength dispersing device having a double-pass arrangement of FIG. 19B or FIG. 19C.

Stray light rejection according to the present invention will now be illustrated. Referring to FIG. 20, a focusing part 200 of a WSS is shown wherein the output beam 177 propagating in the plane of dispersion 199 is focused together with the stray beams 173 and 182 propagating, before the concave mirror 107, at angles Δθ with respect to the plane of dispersion 199, onto the director array 110. The output beam 177 will focus into a focal spot 201. The stray beams 173 and 182 will form stray focal spots 202 and 203 on the director array 110. The focal spots 202 and 203 are spaced apart from the spot 201 of the output beam 177 by approximately $F\Delta\theta$, wherein F is the focal length of the concave mirror 107.

Figure 21:
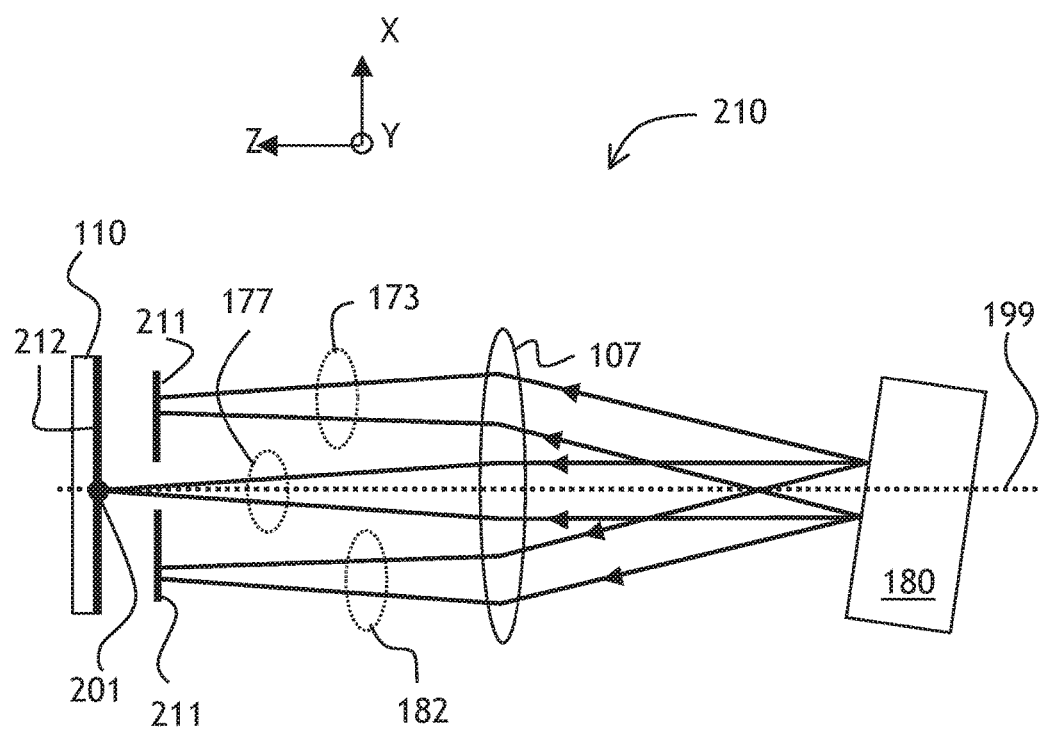
FIG. 21 is a plan view of a section of a wavelength dispersing device having a double-pass arrangement of FIG. 19B or FIG. 19C and a light baffle next to a focal plane.

According to the present invention, light baffles can be used to block the stray beams in a WSS or in a wavelength dispersing device. Referring now to FIG. 21, a focusing part 210 of a WSS is shown having a baffle 211 for blocking the stray beams 173 and 182. The baffle 211 is preferably disposed close to a focal plane 212 of the concave mirror 107 having a focal length in the XZ plane. Preferably, the baffle 211 is positioned at a distance from the focal plane 212 not exceeding 25% of the focal length of the concave mirror 107.

According to the present invention, the embodiments 190B and 190C of the double-pass dispersive unit 180 are preferably used in the wavelength dispersing devices 40 of FIG. 4, 60 of FIG. 6, 80 of FIG. 8, 100 of FIG. 10, and 130 of FIG. 13; as the unit 301 of the WSS 120 of FIG. 12; and in the WSS devices 140 and 150 of FIGS. 14 and 15, respectively. Corresponding baffle arrangements, such as the baffle 211 of FIG. 21, should preferably be used to block stray reflections, which enables the double-pass arrangement of a transmission diffraction grating, which, in its turn, allows for further size reduction of a wavelength dispersing device.

It is to be understood that even though the WSS devices are described herein as preferred embodiments of the invention, the wavelength dispersing devices that these WSS devices are based upon are also a part of this invention. A skilled artisan will understand that these wavelength dispersing devices can be used for other applications that involve dispersing a light beam into narrowband sub-beams having focal spots spaced apart along a line of dispersion, for example, for a spectrograph having a monochromator and a slit, or for a spectrograph having a "polychromator" and a detector array.

Further, the preferred embodiments are described herein as having specific features. These features can be easily combined and, or substituted by those skilled in the art. For example, the above-described wavelength dispersing devices and WSS devices have the concave spherical mirror 107 as a focusing coupler; however, spectrometers and WSS devices can also use toroidal mirrors, which have different radiae of curvature in X and Y-directions, or cylindrical mirrors. Spherical, cylindrical, or even toroidal lenses can also be used in place of mirrors. All of these focusing couplers have optical power, or a focal length, in the plane of dispersion.

What is claimed is:

1. A wavelength dispersing device comprising:
   an input for inputting a light beam;
   an aberration correction element for receiving the light beam and performing pre-correction for aberration;
   a mirror for receiving the pre-corrected light beam and reflecting the pre-corrected light beam at a first point in time;
   a diffraction grating for producing narrowband sub-beams; and
   a reflector for receiving the narrowband sub-beams;
   the narrowband sub-beams being reflected by the mirror at a second point in time,
   the aberration correction element receiving the reflected narrowband sub-beams, performing aberration correction on the reflected narrowband sub-beams, and transmitting the aberration-corrected, reflected narrowband sub-beams to a line of dispersion, and
   the aberration correction element having a wedge angle to apply coma compensation to the light beam and the reflected narrowband sub-beams to compensate for coma caused, at least in part, by the reflection of the pre-corrected light beam by the mirror.

2. The wavelength dispersing device of claim 1, where the reflector and the diffraction grating produce an angular dispersion of the narrowband sub-beams.

3. The wavelength dispersing device of claim 1, where
   each narrowband sub-beam, of the narrowband sub-beams, is associated with a focal spot, and
   each focal spot is located on the line of dispersion.

4. The wavelength dispersing device of claim 1, where the mirror is a concave mirror.

5. The wavelength dispersing device of claim 1, where the aberration correction element is a wedge.

6. The wavelength dispersing device of claim 5, where the wedge is oriented at a minimum deviation angle for the narrowband sub-beams.

7. The wavelength dispersing device of claim 1, where the coma is further caused by off-axis reflections of the pre-corrected light beam.

8. The wavelength dispersing device of claim 1, where the coma is further caused by off-axis reflections of the pre-corrected light beam and the narrowband sub-beams from the mirror.

9. The wavelength dispersing device of claim 1, where an array of directors are disposed along the line of dispersion.

10. A method comprising:
    inputting, at an input, a light beam;
    performing, by an aberration correction element, pre-correction for aberration on the light beam;
    receiving, by a mirror, the pre-corrected light beam and reflecting the pre-corrected light beam at a first point in time;
    producing, by a diffraction grating and based on received the reflected light beam, narrowband sub-beams;
    the narrowband sub-beams being reflected by the mirror at a second point in time;
    receiving, by the aberration correction element, the reflected narrowband sub-beams;
    performing, by the aberration correction element, aberration correction on the reflected narrowband sub-beams,
    the aberration correction element having a wedge angle to apply coma compensation to the light beam and the reflected narrowband sub-beams to compensate for coma caused, at least in part, by the reflection of the pre-corrected light beam by the mirror; and
    transmitting, by the aberration correction element, the aberration-corrected, reflected narrowband sub-beams to a line of dispersion.

11. The method of claim 10, further comprising:
    producing, by a reflector and the diffraction grating, an angular dispersion of the narrowband sub-beams.

12. The method of claim 10, where
    each narrowband sub-beam, of the narrowband sub-beams, is associated with a focal spot, and
    each focal spot is located on the line of dispersion.

13. The method of claim 10, where the mirror is a concave mirror.

14. The method of claim 10, where the aberration correction element is a wedge.

15. The method of claim 14, where the wedge is oriented at a minimum deviation angle for the narrowband sub-beams.

16. The method of claim 10, where the coma is further caused by off-axis reflections of the pre-corrected light beam.

17. The method of claim 10, where the coma is further caused by off-axis reflections of the pre-corrected light beam and the narrowband sub-beams from the mirror.

18. The method of claim 10, where an array of directors are disposed along the line of dispersion.

\* \* \* \* \*